(12) United States Patent
Sahai et al.

(10) Patent No.: US 8,605,655 B1
(45) Date of Patent: Dec. 10, 2013

(54) POLICY AND CHARGING CONTROL RULE PRECEDENCE MAPPING IN WIRELESS CONNECTIVITY ACCESS NETWORKS

(75) Inventors: Gazal Sahai, Santa Clara, CA (US); Prasad Chigurupati, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 362 days.

(21) Appl. No.: 12/947,463

(22) Filed: Nov. 16, 2010

(51) Int. Cl.
H04W 80/04 (2009.01)

(52) U.S. Cl.
USPC ........................................ 370/328; 455/343.4

(58) Field of Classification Search
USPC .................. 370/235, 238, 328; 709/235, 240; 455/445

See application file for complete search history.

(56) References Cited

U.S. PATENT DOCUMENTS

| | | | | |
|---|---|---|---|---|
| 2002/0056006 | A1* | 5/2002 | Vange et al. | 709/235 |
| 2008/0019275 | A1* | 1/2008 | Mudireddy et al. | 370/235 |
| 2008/0020775 | A1* | 1/2008 | Willars | 455/445 |

OTHER PUBLICATIONS

3GPP TS 23.203 V10.1.0, 3rd Generation Partnership Project; Technical Specification Group Services and System Aspects; Policy and charging control architecture (Release 10), Sep. 2010, 132 pp.

3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 173 pp.

3GPP TS 36.300 V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.

3GPP TR 23.803 V7.0.0, 3rd Generation Partnership Project; Technical Specification Group Services and System Aspects; Evolution of policy control and charging (Release 7), Sep. 2005, 30 pp.

Overview of 3GPP Release 5 V0.1.1, Feb. 2010, 66 pp.

The Evolution of UMTS-3GPP Release 5 and Beyond, Jun. 2004, 24 pp.

* cited by examiner

*Primary Examiner* — Chi Pham
*Assistant Examiner* — Raul Rivas
(74) *Attorney, Agent, or Firm* — Shumaker & Sieffert, P.A.

(57) ABSTRACT

In general, techniques are described for mapping precedence domains between a network device of a content access network and a wireless communication device. For example, a Policy Charging and Enforcement Function (PCEF) entity maps relatively high-resolution mobile network policy and charging and control (PCC) rule precedence to relatively low-resolution packet filter precedence. The PCEF performs the mapping to maintain a packet filter precedence ordering for packet filters that accords with a precedence ordering among respective PCC rules from which the PCEF derives the packet filters.

16 Claims, 6 Drawing Sheets

POLICY AND CHARGING CONTROL RULE PRECEDENCE MAPPING IN WIRELESS CONNECTIVITY ACCESS NETWORKS

TECHNICAL FIELD

The invention relates to mobile networks and, more specifically, to policy and charging control within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

The increasing number and bandwidth requirements of services available to mobile devices pressures available mobile network resources. Policy and charging control (PCC) provides network operators with the means to manage service connections to ensure an efficient utilization of core, transport, and radio network resources. Different services, such as Internet, E-mail, voice, and multimedia, have different quality of service (QoS) requirements that, moreover, may vary by user. To manage service connections in a consistent manner for a mobile network that simultaneously carries multiple different services for multiple users, PCC provides a centralized control to determine an appropriate transport path for services, determine QoS requirements for the services, and determine resource allocation necessary to ensure QoS characteristics of transport paths sufficient to meet the QoS requirements for the various services.

SUMMARY

In general, techniques are described for mapping relatively high-resolution mobile network policy and charging control (PCC) rule precedence to relatively low-resolution packet filter precedence that controls the order in which packet filters are applied in real-time to traffic within a mobile network. The mobile network, or "IP Connectivity Access Network" (IP-CAN), ensures that traffic mapping information deployed to individual wireless devices reflects the bearer binding of PCC rules for an IP-CAN session for each wireless device. Traffic mapping information deployed to an individual wireless device may include, for instance, one or more packet filters for an IP-CAN packet-switched domain such as GPRS or Evolved Packet System (EPS). In general, the IP-CAN uses session data flow (SDF) filters of the PCC rules, which provide parameters for policy, gating, and/or charging control of packets traversing an IP-CAN gateway, to derive the traffic mapping information. To enable consistent mapping of uplink and downlink packets to bearers, the IP-CAN assigns precedence to packet filters of the traffic mapping information to maintain a packet filter precedence ordering that accords with the precedence ordering among respective PCC rules from which the packet filters were derived. In addition, the IP-CAN assigns initial precedence to packet filters of traffic mapping information for the IP-CAN session to enable flexible insertion of additional packet filters to accommodate additional PCC rules or modifications to existing PCC rules for the IP-CAN session.

For example, as described herein, the Policy and Charging Enforcement Function (PCEF) entity receives from the Policy Control and Charging Rules Function (PCRF) entity a minimum and maximum value that define a range of PCC rules precedence values for an IP-CAN session. The PCEF uses the range to determine relative precedence of individual PCC rules within the range. That is, the PCEF calculates relative precedence positions within the range for individual PCC rules from the precedence values specified for such rules and maps the relative precedence positions to a packet filter precedence value range. The PCEF then assigns a precedence value to packet filters derived from an individual PCC rule according to the mapped packet filter precedence value for the PCC rule. In addition, the PCEF may insert intervals, or "gaps," between mapped PCC rules in the packet filter precedence value range to allow the PCEF to insert additional packet filters when the PCEF receives additional PCC rules or additional SDF filters for existing rules.

In one embodiment, the invention is directed to a method of mapping precedence domains between a network device of a connectivity access network and a wireless communication device, the method comprising receiving, with the network device, a rule for the wireless communication device that defines a first packet filter and a rule precedence value for a rule precedence supported by the network device, wherein the rule precedence value defines an order of the rule within the network device with respect to other rules for the wireless communication device defined within the network device. The method further comprises mapping, with the network device, the rule precedence value to a filter precedence value for a filter precedence supported by the wireless communication device, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device. The method additionally comprises outputting, with the network device, a message specifying the first one packet filter and the filter precedence value to the wireless communication device.

In another embodiment, the invention is directed to a network device of a connectivity access network, the network device comprising a packet management entity that receives a rule, for a wireless communication device attached to the connectivity access network, that defines a first packet filter and a rule precedence value for a rule precedence supported by the network device, wherein the rule precedence value defines an order of the rule within the network device with respect to other rules for the wireless communication device defined within the network device. The network device additionally comprises a mapping module that maps the rule precedence value to a filter precedence value for a filter precedence supported by the wireless communication device, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device, and wherein packet management entity outputs a message specifying the first one packet filter and the filter precedence value to the wireless communication device.

In another embodiment, the invention is directed to a computer-readable medium containing instructions. The instructions cause a programmable processor to receive, with a network device of a connectivity access network, a rule for a wireless communication device that defines a first packet filter and a rule precedence value for a rule precedence supported by the network device, wherein the rule precedence value defines an order of the rule within the network device with respect to other rules for the wireless communication device defined within the network device. The instructions further cause the programmable processor to map, with the network device, the rule precedence value to a filter precedence value for a filter precedence supported by the wireless communication device, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device. The instructions additionally cause the programmable processor to output, with the network device, a message specifying the first one packet filter and the filter precedence value to the wireless communication device.

The techniques may provide one or more advantages. For example, assigning filter precedence in accordance with relative precedence of PCC rules from which those filters are derived may maintain an ordering that ensures that traffic mapping information reflects the bearer binding of PCC rules.

Moreover, distributing filter precedence values across the full available filter precedence value range may provide flexibility to allow the PCEF to easily insert additional packet filters with the range when the PCEF receives additional PCC rules or additional SDF filters for existing rules. Distributing filter precedence values using the relative precedence and gap insertion techniques may thus reduce the probability of requiring reshuffle of packet filters to maintain proper precedence among the packet filters and, as a result, may reduce processing within the PCEF as a well as the number of control messages directed to a UE to accomplish the filter reshuffling for filters on the UE.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
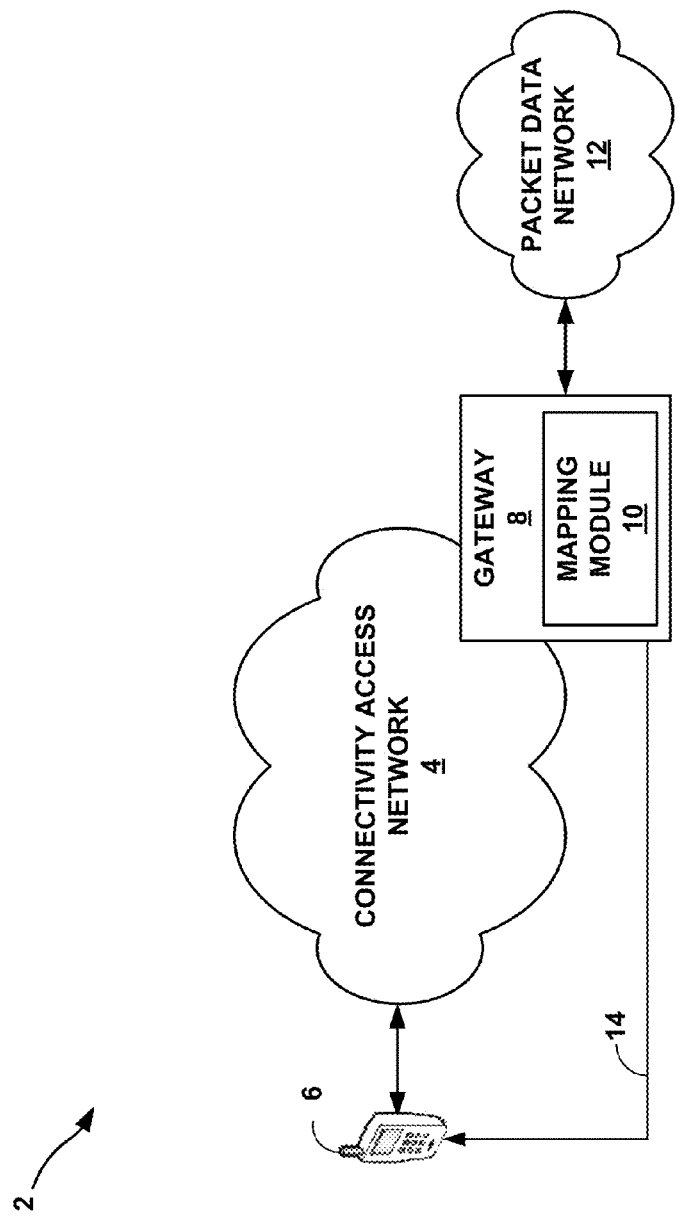
FIG. 1 is a block diagram illustrating an example network system that performs precedence mapping according to the described techniques.

FIG. 1 is a block diagram illustrating an example network system 2 that performs precedence mapping according to the described techniques. In this example, network system 2 comprises packet data network (PDN) 12 coupled to connectivity access network 4 ("CAN 4") via gateway 8 of CAN 4. Packet data network 12 supports one or more packet-based services that are available for request and use by wireless device 6. As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 6 is a wireless communication device that may comprise, for example, a mobile telephone, a laptop or desktop computer having, e.g., a 3G/4G wireless card, a wireless-capable netbook, a video game device, a pager, a smart phone, a personal data assistant (PDA), a utility meter, or a security device such as a motion detector or door lock. Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as User Equipment (UE) or Mobile Stations (MS).

A service provider operates CAN 4 to provide network access, data transport and other services to wireless device 6. In general, CAN 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Connectivity access network 4 may, alternatively or in conjunction with one of the above, implement a code division multiple access-2000 ("CDMA2000") architecture. Connectivity access network 4 may, again as an alternative or in conjunction with one or more of the above, implement a WiMAX architecture defined by the WiMAX forum.

Connectivity access network 4 may comprise a core packet-switched network (not shown in FIG. 1) and one or more radio access networks (not shown in FIG. 1). A core packet-switched network of CAN 4 may comprise, for example, a general packet radio service (GPRS) core packed-switched network, an IP-based mobile multimedia core network, or an Evolved Packet Core (EPC). Wireless device 6 communicates with CAN 4 using a wireless communication link to one of the radio access networks of the connectivity access network. Radio access networks of CAN 4 may include, for example, for example, a GSM Radio Access Network (GRAN), a WiMAX radio access network, a UMTS Radio Access Network (UTRAN), and/or an evolution of a UTRAN known as an E-UTRAN. Connectivity access network 4 may further include a backhaul or transport network (not shown) that includes land-based transmission lines, frequently leased by a service provider for the connectivity access network, to transport user and control traffic between wireless device 6 and gateway 8. The backhaul network also includes network devices such as aggregation devices and routers.

Gateway 8 is a network device that operates as a gateway to PDN 12 and may comprise, for example, a Gateway GPRS Serving Node (GGSN), an Access Gateway (aGW), or a Packet Gateway (P-GW). Gateway 8 may comprise a router. While described herein with respect to one or more particular architectures for ease of illustration purposes, CAN 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Gateway 8 and other elements of connectivity access network 4 may, therefore, each represent an abstraction of devices found within any type of mobile network architectures.

Connectivity access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Wireless device 6 attaches to CAN 4, which establishes a CAN session and a default bearer to carry user traffic for the wireless device as part of an attach procedure. The CAN session is an association between CAN 4 and wireless device 6 that is identifiable by a combination of a wireless device 6 PDP address and an Access Point Name (APN) for PDN 12. Besides establishing a default bearer, the attach procedure may trigger establishment, by CAN 4, of one or more dedicated bearers between gateway 8 and wireless device 6 to carry user traffic. Dedicated bearers operate according to a different set of quality of service (QoS) parameters and thus provide QoS differentiation to packet flows of various services engaged by wireless device 6. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. A particular bearer may transport packet flows for multiple service sessions of a CAN session when the QoS characteristics of the bearer match the requirements of the service sessions. In an IP-based connectivity access network 4, a CAN session comprises an IP-CAN session.

Gateway 8 is a network device that implements policy and charging control (PCC) functionality for CAN 4. An operator and/or an external entity, such as a Policy and Charging Rules Function entity, provisions gateway 8 with one or more PCC rules that each specify a set of information enabling the detection of a service data flow and providing policy control and/or charging control parameters. Gateway 8 enforces service flow-based policy and charging control according to the PCC rules. Further details regarding policy and charging control are found in "3GPP TS 23.203—Policy and Charging Control Architecture (Release 10)," Version 10.1.0, 3rd Generation Partnership Project, Technical Specification Group Services and System Aspects, September 2010, which is incorporated herein by reference in its entirety.

A PCC rule includes a rule identifier that uniquely identifies the rule within a CAN session, service data flow detection information, charging information, and/or policy control information. Policy control information specifies parameters for gating control (i.e., permit/deny), QoS control, and QoS signaling. Service data flow detection information includes a precedence value and a service data flow template that specifies traffic mapping information to identify packet flows for a service session. Traffic mapping information may include one or more packet filters that include parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The set of packets detected by applying the service data flow template of a particular PCC rule are referred to as a service data flow. A service data flow may include packets for multiple service sessions. Packet filters of a service data flow template may be alternatively referred to herein as service data flow filters.

Gateway 8 associates service data flows (and, by extension, the corresponding PCC rule) to particular bearers for a CAN session during a binding process to ensure that packet flows within the services data flows receive an appropriate QoS from CAN 4. For a given PCC rule, gateway 8 analyzes policy control information therein to determine whether an existing bearer for the relevant CAN session is sufficient to provide the requisite QoS. If not, gateway 8 initiates establishment of a new, suitable bearer. Gateway 8 creates bindings between (or "binds") one or more service data flows and the bearer that matches the QoS specified in corresponding PCC rules for the service data flows. A particular bearer established to provide a particular QoS scheme may thus carry packet flows matched by one or more PCC rules.

Gateway 8 evaluates service data flow templates of corresponding PCC rules for application to packets traversing the CAN 4 boundary in the order of the corresponding PCC rules precedence. PCC rules precedence is specified by the precedence value in the service data flow detection information of each respective PCC rule. During evaluation of a packet, matching a packet filter in a service data flow template for a PCC rule causes gateway 8 to map the packet to the bearer to which the PCC rule is bound.

In accordance with the techniques of this disclosure, to ensure consistent QoS enforcement across CAN 4 in both the downlink and uplink directions, gateway 8 provides wireless device 6 with packet filters that include the same traffic mapping information as that found in the service data flow template traffic mapping information. In provisioning the packet filters to wireless device 6, gateway 8 includes mapping module 10 to maintain the precedence order of traffic mapping information found in PCC rules, ordered according to respective precedence values, by assigning filter precedence values in a manner that preserves the ordering of the respective traffic mapping information found therein. In other words, mapping module 10 maps PCC rule precedence values to wireless device 6 packet filter precedence values to ensure wireless device 6 evaluates packet filters in the same ordering as that in which gateway 8 evaluates the PCC rules from which the packet filters are respectively derived. After deriving the packet filters from the PCC rules for the CAN session and assigning packet filter precedence values according to a proper ordering, gateway 8 delivers the packet filters in installation message 14 to wireless device 6 for application to packet flows.

As a result, both uplink traffic mapping information at wireless device 6 and downlink traffic mapping information at gateway 8 reflect the bearer binding of PCC rules and associated quality of service (QoS) rules and may ensure consistent application of QoS to upstream and downstream service data flows.

Figure 2:
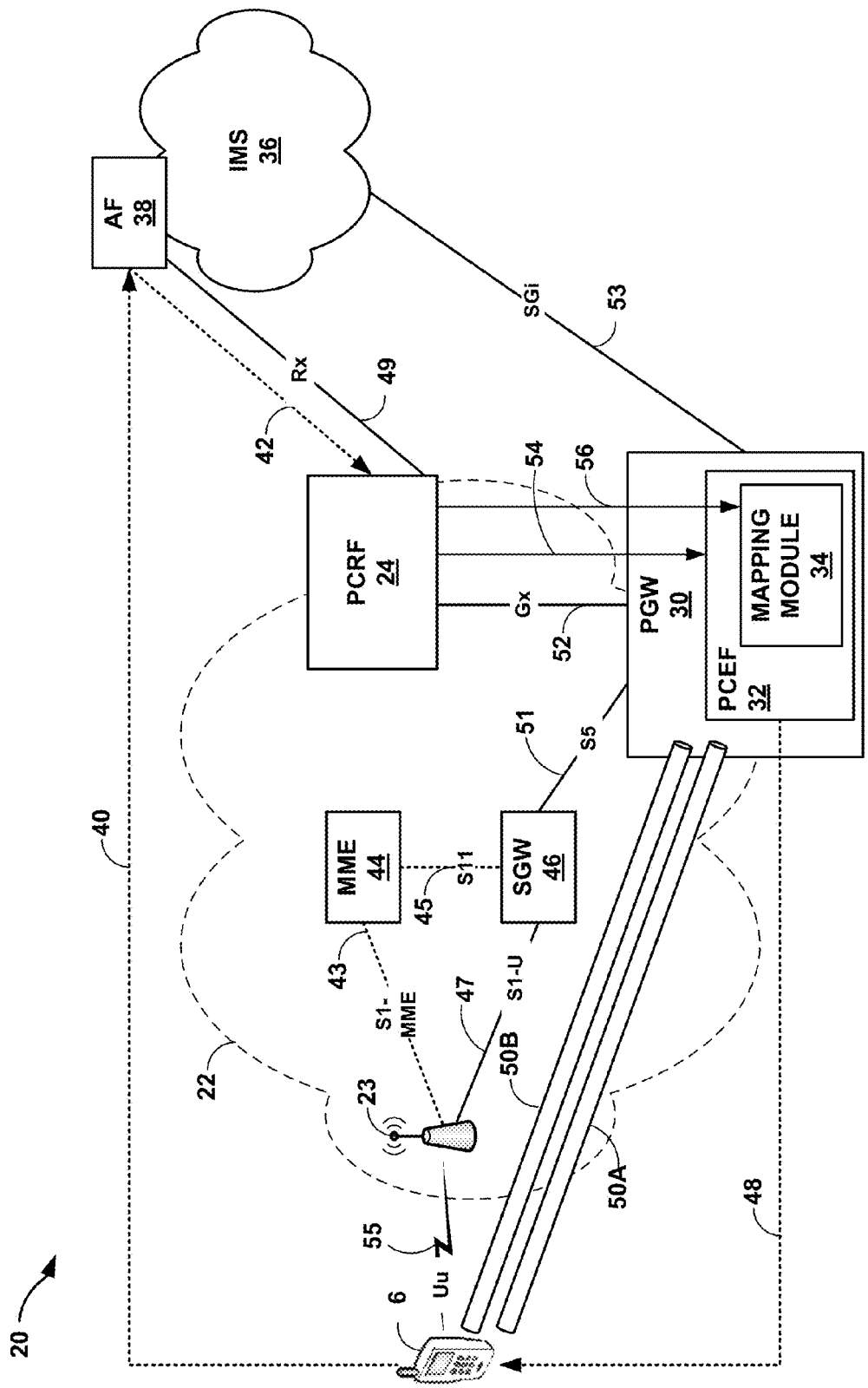
FIG. 2 is a block diagram illustrating an example network system that maps policy control and charging rule precedence values to packet filter precedence values using techniques described herein.

FIG. 2 is a block diagram illustrating an example network system 20 that maps policy control and charging rule precedence values to packet filter precedence values using techniques described herein. In this example, network system 20 includes a Long Term Evolution (LTE) mobile service provider network 22 ("LTE network 21") that includes an Evolved Packet Core (EPC) interfaced to an Evolved UTRAN (E-UTRAN) 23. LTE network 22 enables and transports service data exchanged between wireless device 6 and IMS network 36. LTE network 22 may represent an embodiment of connectivity access network 4 of FIG. 1.

LTE network 22 provides mobility management, session management, and packet routing and transfer for network system 20. The LTE network 22 EPC comprises PDN Gateway 30 ("PGW 30") logically connected to Serving Gateway 46 ("SGW 46") via S5 interface 51 operating over a communication link. PGW 30 hosts packet filtering, lawful interception, PDP address allocation, and other functionality. PGW 30 is an edge router between LTE network 22 and external PDNs, e.g., IMS 36, and hosts lawful interception and PDP address allocation, among other functionality. As described in additional detail below, PGW 30 comprises Policy and Charging Enforcement Function 32 to perform packet gating and filtering.

PGW 30 may represent an embodiment of gateway 8 of FIG. 1. S5 interface 51 provides protocols to foster user plane tunneling and tunnel management between PGW 30 and SGW 46. S5 interface 51 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 46 hosts mobility anchoring, packet routing and forwarding, lawful interception, and other functionality.

The LTE network 22 EPC additionally comprises Mobility Management Entity 44 ("MME 44") logically connected to SGW 46 via S11 interface 45 operating over a communication link. S11 interface 45 provides protocols with which MME 44 establishes and manages bearers that traverse or terminate at SGW 46. S11 interface 45 may comprise a control plane protocol stack that includes GTP-Control Plane (GTP-C) executing over UDP/IP. In addition to bearer management and establishment, MME 44 hosts Non-Access Stratum (NAS) signaling, PDN 30 and SGW 46 selection, roaming, and authentication, for instance. In various embodiments, LTE network 22 comprises additional MMEs, SGWs, and/or PGWs.

SGW 46 and MME 44 connect to E-UTRAN 23 via respective aspects of an S1 interface. Specifically, SGW 46 logically connects to individual E-UTRAN 23 via S1-U interface 47 operating over a communication link, and MME 44 logically connects to individual E-UTRAN 23 via S1-MME interface 43 operating over a communication link to establish bearers over S1-U interface 47 between SGW 46 and E-UTRAN 23. E-UTRAN 23 comprises one or more eNode Bs. E-UTRAN 23 is communicatively coupled to wireless device 6 via a radio link operating over Uu interface 55.

Wireless device 6, which represents an embodiment of wireless device 6 of FIG. 1, is a User Equipment (UE) that attaches to LTE network 22 to receive services during an attachment session identifiable by a combination of a wireless device 6 PDP address and an IMS 36 APN. Applications executing on wireless device 6 issues resource requests 40 to application function 38 to initiate service sessions for corresponding services. Resource requests 40 are application-layer signaling messages Network 20 additionally comprises IP Multimedia Subsystem 36 ("IMS 36"), an operator service that the operator of LTE network 22 may use to provide services using, for example, the Session Initiation Protocol (SIP). In some embodiments, IMS 36 represents one or more other instances of the services layer that provides services to devices, including wireless devices, attached to respective connectivity access networks, such as LTE network 2. For example, IMS 36 may represent non-IMS based operator services operating according to other standard or proprietary protocols. As another example, IMS 36 may represent services not provided by the operator of LTE network 22 and instead provided, for instance, via the Internet or another packet data network.

IMS 36 comprises application function 38 ("AF 38"), an IMS 36 element that offers applications requiring dynamic policy and/or charging with control over service data traffic that traverses LTE network 22. Application function 38 is communicatively coupled to Policy Control and Charging Rules Function entity 24 ("PCRF 24") via Rx interface 49. Application function 38 receives resource requests 40, which each comprise a request for a different service session, such as an IMS voice call, from wireless device 6. Application function 38 extracts service session description information from resource requests 40 and provides service session description information, such as Session Description Protocol (SDP) parameters, to PCRF 24 in service session description messages 49 sent over Rx interface 49. A service session may be alternatively referred to as an AF session or application session.

PCRF 24 provides network control for LTE network 22 by way of service data flow (SDF) detection, QoS, gating and packet flow-based charging. PCRF 24 receives service session description information for service sessions in service session description messages 49, calculates the proper QoS authorization, and generates new (and/or modifies existing) PCC rules that determine treatment of matching service data flows in Policy Charging and Enforcement Function entity 32 ("PCEF 32") and other components of LTE network 22. PCRF 24 installs the new (and/or modified) PCC rules for service sessions to PCEF 32 using PCC rule installation messages 54 sent over Gx interface 52, a reference point between PCRF 24 and PCEF 32 that enables signaling of PCC rules. Gx interface 52 executes a communication protocol that may comprise, for example, Remote Authentication Dial-In User Service (RADIUS) or Diameter. PCRF 24 may be implemented within a router and, in various embodiments, LTE network 22 may comprise multiple PCRFs interconnected to multiple PGWs. In some instances, PCRF 24 receives service session information from PCEF 32, a Subscription Profile Repository (SPR), or a Bearer Binding and Event Reporting Function (BBERF) entity in addition to, or instead of, from AF 38.

PCEF 32 is a packet management entity of PGW 30 that performs service data flow detection, policy enforcement and flow based charging. PCEF 32 receives dynamic PCC rules determined by PCRF 24 for service sessions in PCC rule installation messages 54 via Gx interface 52. In some instances, an operator provisions PCEF 32 with pre-defined/static PCC rules created and configured by the operator.

Upon receiving new PCC rules for corresponding service sessions, PCEF 24 initiates establishment of new bearers, or modification or utilization of existing bearers and binds the bearers to the PCC rules. As a result, PCEF 32 causes PGW 30 to transport inbound packets that match service data flow templates of any of the PCC rules using the respective bearer to which the PCC rule is bound. PCEF 32 may bind multiple PCC rules to a single bearer.

In the illustrated embodiment, PCEF 32 upon receiving PCC rules in PCC rule installation messages 54 initiates establishment, within LTE network 22, of bearers 50A–50B ("bearers 50") for the wireless device 6 session for transporting session data flows between the wireless device and IMS 36 by way of PGW 30. Each of bearers 50 operates according to distinct QoS parameters and thus exhibits distinct QoS characteristics. Each of bearers 50 may comprise, for instance, an EPS bearer and/or a Radio Access Bearer (RAB). PCEF 32 binds each of the received PCC rules generated responsive to the appropriate one of bearers 50 according to the policy control information specified within the respective PCC rules.

To facilitate consistent handling of service session packets by LTE network 22, PCEF 32 derives packet filters from PCC rules to reflect the bearer binding of PCC rules on PCEF 32 for the service sessions, and PCEF 32 provides the derived packet filters to wireless device 6. PCC rules each include a precedence value within a defined range that defines an order of the rule within PCEF 32 with respect to the other rules within PCEF 32. Packet filters for wireless device 6 include a separate precedence value within a defined range that is different from that of the PCC rules and defines an order of the packet filters within wireless device 6. The ordering defined by the rule precedence and filter may specify an order of evaluation by PCEF 32 and wireless device 6, respectively.

In accordance with the techniques herein described, PCEF 32 comprises mapping module 34 to map PCC rules precedence to wireless device 6 packet filter precedence. Mapping module 34 maps rule precedence values to packet filter precedence values to provide a packet filter ordering that follows the ordering defined for the PCC rules.

PCC rule precedence values are integer values a theoretical, or possible, range commensurate with the number of bits, e.g., 32, allocated to the precedence parameter. However, the actual range of precedence values for a particular set of one or more PCC rules may be much smaller. PCRF 24, together with PCC rule installation messages 54 or responsive to a query from PCEF 32, therefore sends range message 56 via Gx interface 52 to PCEF 32. Range message 56 includes range minimum and range maximum values that represent the minimum and maximum current precedence values for PCC rules received by PCEF 32 for the wireless device 6 session. In other words, the range minimum and range maximum values bound the actual range of the PCC rule precedence values for the wireless device 6 session. Range message 56 may be a Diameter or RADIUS message. For example, range message 56 may be a Diameter Credit Control Answer (CCA) message modified to include a range minimum and a range maximum attribute value pair (AVP) that carry the range minimum and range maximum values, respectively, for the PCC rules. PCEF 32 may associate range message 56 to one or more PCC rules for the wireless device 6 session using a session identifier, such as a session identifier AVP in instances where range 56 comprises a CCA message.

Packet filter precedence values are integer values in a defined range commensurate with the number of bits, e.g., 8, allocated to a packet filter precedence parameter. In some instances, the defined range for packet filter precedence values is smaller than the defined range for PCC rule precedence values, requiring compression of the larger PCC rule precedence range into the smaller packet filter rule precedence range.

In accordance with the described techniques, mapping module 34 maps individual PCC rules for the wireless device 6 session to integers within the packet filter precedence range according to a relative position of the individual PCC rules within the actual PCC rule precedence range. For example, mapping module 34 maps the actual PCC rule precedence range minimum and range maximum values received in range message 56 for the wireless device 6 session to the packet filter precedence value range minimum and range maximum values, respectively. In this way, mapping module 34 maps filters for PCC rules having precedence values matching the actual PCC rule precedence range minimum and range maximum values received in range message 56 to the minimum and maximum of the filter range. In addition to mapping precedence values for PCC rules having the minimum and maximum precedence values, mapping module 34 maps precedence values for the remaining PCC rules.

In some embodiments, mapping module 34 maps the actual PCC rule precedence range maximum value received in range message 56 for the wireless device 6 session to the packet filter precedence value range maximum value minus a defined filter interval, or "filter gap," that is described in further detail below. In such embodiments, mapping module 34 may thus map multiple packet filters derived from the PCC rule having the actual precedence range maximum value to packet filter precedence values within the filter gap before reaching the packet filter precedence value maximum.

Mapping module 34 having derived the packet filters from the PCC rules for the wireless device 6 session and mapped the PCC rule precedence values to packet filter precedence values, PCEF 32 installs the packet filters to wireless device 6 using filter download messages 48 for establishing bearers 50. Filter download messages may, for example, comprise a combination of one or more Create Bearer Request messages or Update Bearer Request messages that include traffic filter templates comprising the packet filters for bearers 50. Wireless device 6 uses the received packet filters to detect and direct upstream packet flows for services to the appropriate one of bearers 50 for the respective services.

Figure 3:
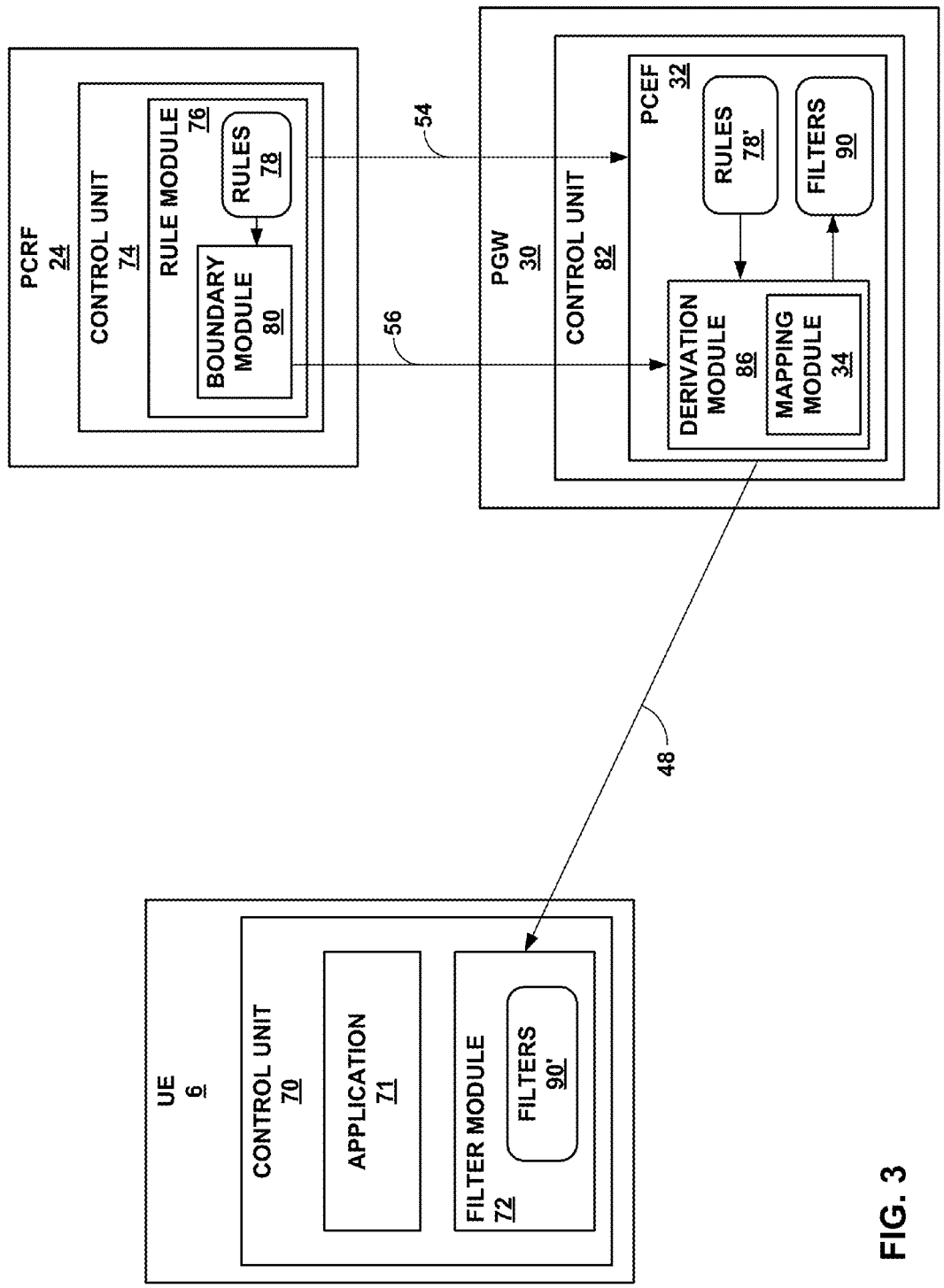
FIG. 3 is a block diagram illustrating example devices of FIG. 3 in further detail.

FIG. 3 is a block diagram illustrating example PCRF device 24 ("PCRF 24"), example PGW 30, and example wireless device 6 (illustrated as "UE 6") of FIG. 2 in further detail. PCRF 24, PGW 30, and wireless device 6 comprise respective control units 74, 82, and 70. Each of control units 74, 82, and 70 may include one or more processors or controllers (not shown in FIG. 3) that execute software instructions, such as those used to define a software or computer program, stored to a tangible computer-readable medium (again, not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 74, 82, and 70 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 74 of PCRF 24 provides an operating environment for rule module 76 to manage and provide policy and charging control (PCC) rules 78 (illustrated as "rules 78") and PCC rule metadata to PCEF 32 of PGW 30 in accordance with the described techniques. Rule module 76 determines, for various services, the manner in which corresponding service data flows shall be treated with respect to, e.g., QoS and charging by PCEF 32. Rule module 76 performs session binding to generate PCC rules 78 that direct PCEF 32 bearer binding, charging, reporting, credit management, and event triggering.

Each of PCC rules 78 comprises a 32-bit precedence value, for example, and a service data flow template that comprises one or more service data flow filters that include parameters with which to match packets. Multiple PCC rules 78 for an individual session for a wireless device may have identical precedence values, and rule module 76 may modify PCC rules 78 preferences values during an ongoing session. In addition, rule module 76 may add or remove individual PCC rules 78 for an ongoing session.

Service data flow filter parameters may include an IP 5-tuple and or DPI parameters. PCC rules 78 may comprise an associative data structure to map sets of PCC rules to individual sessions for wireless devices, including wireless device 6, attached to LTE network 22 of FIG. 2. Such sessions may comprise IP-CAN sessions. Rule module 76 issues one or more PCC rule installation messages 54 to PCEF 32 to install the PCC rules to PCEF 32, which stores the PCC rules as PCC rules 78'. Rule module 76 provides additional PCC rule installation messages 54 to PCEF 32 upon modifications to one or more of PCC rules 78 to ensure PCC rules 78' store up-to-date policy control information and service data flow detection information.

Boundary module 80 of rule module 76 analyzes PCC rules for wireless device 6 session in PCC rules 78 to determine minimum and maximum precedence values for the PCC rules for the wireless device 6 session. Boundary module 80 sends the determined minimum and maximum PCC rule precedence values to PCEF 32 in range message 56.

Control unit 82 of PGW 30 provides an operating environment for PCEF 32 to apply PCC rules 78' received from PCRF 24 in PCC rule installation messages 54 to perform bearer binding, charging, reporting, credit management, and event triggering accordingly. In some embodiments, an operator statically provisions a subset of PCC rules 78' via an administrative interface, such as a remote procedure call or a command-line interface.

Derivation module 86 of PCEF 32 derives filters 90 from PCC rules 78' to ensure that traffic mapping information used by wireless device 6 to select appropriate bearers for packet flows reflects the bearer binding of PCC rules 78'. Filters 90 may comprise one or more traffic filter template (TFT) filters that incorporate policy control information and service data flow detection information of PCC rules 78'. Because the representation of TFTs is access network-dependent, derivation module 86, when necessary, reformulates the service data flow filters to TFT filters compatible with LTE network 22 and/or wireless device 6.

Each of filters 90 includes a precedence value that defines an order of the filter with respect to the other ones of filters 90. For example, the precedence values of filters 90 may determine an order of evaluation for the filters for mapping a packet to a bearer. Filters 90 precedence values are integer values in a defined range commensurate with the number of bits, e.g., 8, that stores the precedence value. Because wireless device 6 may not support the PCC rule precedence, the precedence values assigned to filters 90 may differ from PCC rule precedence values.

For each one of filters 90 derived from a particular one of PCC rules 78' for a wireless device 6 session, mapping module 34 of derivation module 86 maps the precedence value of the particular PCC rule to a precedence value for the filter. Mapping module 34 performs precedence value mapping to maintain, among filters 90 for the wireless device 6 session, an ordering for the packet filters that matches the ordering of service data flow filters, of service data flow templates for PCC rules, from which derivation module 86 derived the packet filters. Upon calculating and assigning filter precedence values to filters 90, PCEF 32 installs packet filters 90 for the wireless device 6 session to wireless device 6 using filter download messages 48 for storage and use as filters 90'.

In this way, PCEF 32 may provide TFT filters to wireless device 6 that include similar substantive content as found in service data flow template filters of PCC rules 78' and may cause wireless device 6 to select bearers that comport with QoS prescriptions of PCC rules 78'.

In some embodiments, mapping module 34 calculates a relative filter precedence for each one of filters 90 by determining the relative precedence of the one of PCC rules 78', from which the filter was derived, within a PCC rule precedence range specified by the minimum and maximum PCC rule precedence values received in range message 56 from PCRF 24 for the wireless device 6 session. Mapping module 34 then uses the calculated relative precedence to determine a relative precedence for the filter within a filter precedence range that is different from the PCC rule precedence range. In one example, mapping module 34 calculates the relative filter precedence within a filter precedence range according to the formula:

$$r = \frac{(p - \min) \times (rangeSize - 1)}{(\max - \min)} \quad (1)$$

Within formula (1), r denotes the calculated relative precedence for a particular one of filters 90, p denotes the PCC rule precedence of the one of PCC rules 78' from which the particular one of filters 90 was derived, min and max denote the minimum and maximum PCC rule precedence values for the wireless device 6 session, and rangeSize denotes the size of the filter precedence range. In some instances, filter precedence values are 8-bit integers resulting in a rangeSize=256. Mapping module 34 assigns the calculated relative precedence, r, as the filter precedence value for the particular one of filters 90 for which mapping module 34 calculates r. In instances where derivation module 86 derives multiple filters 90 from a single one of PCC rules 78', mapping module 34 assigns the calculated relative precedence r to the first one of the filters and increments r for assignation to subsequent such filters. For example, for a PCC rule 78' from which derivation module 86 derives F1 and F2 of filters 90, mapping module 34 assigns calculated relative precedence r for the PCC rule as an F1 precedence value and assigns r+1 as an F2 precedence value. By assigning filter precedence values according to a relative precedence within a filter precedence value range, mapping module 34 distributes filter precedence values across the full available filter precedence value range may provide flexibility to allow PCEF 32 to easily insert additional packet filters with the range when PCEF 32 receives additional PCC rules 78' or modifications to existing PCC rules 78' that add additional service data flow filters and result in additional filters 90.

In some embodiments, mapping module 34 divides a filter precedence range according to a defined interval, or "filter gap," to accommodate multiple filters 90 derived from the same PCC rule 78'. In other words, a filter gap is an integer that represents a number of filter precedence values to divide mapped PCC rule precedence values from one another. In such embodiments, mapping module 34 maps filters 90 derived from a first one of PCC rules 78' beginning at a first filter precedence value. Mapping module 34 maps filters 90 derived from a second one of PCC rules 78' that would otherwise be mapped beginning at the first filter precedence value to a second filter precedence value that represents the first filter precedence value plus the filter gap. Due to the filter gap between filters 90 derived from the first one of PCC rules 78' and filters 90 derived from the second one of PCC rules 78', a modification to the first one of PCC rules 78' that causes derivation module 86 to derive an additional filter from the rule may be mapped by mapping module 34 to a filter precedence value within the filter gap. As a result, mapping module 34 need not necessarily "shift" the precedence values of filters 90 derived from the second one of PCC rules 78' to accommodate the additional filter.

In some embodiments that implement a filter gap, mapping module 34 assigns, to an initial packet filter derived from one of PCC rules 78', a precedence value that is a multiple of the filter gap. Mapping module 34 assigns additional packet filters derived from the same one of PCC rules 78' to subsequence precedence values. In one example, for a relative precedence r for an initial packet filter as calculated by mapping module 34 according to formula (1), mapping module 34 determines a nearest filter precedence value to r that is a multiple of the filter gap and assigns the value to the initial packet filter.

Including filter gaps may reduce the probability of requiring reassignment, or "reshuffling," of filter 90 precedence values upon modifications to PCC rules 78' that cause derivation module 86 to derive and insert additional filters 90. As a result, the techniques may reduce processing within PCEF 32 as a well as an amount of signaling data directed to wireless device 6 to accomplish filter reshuffling for filters 90' on wireless device 6.

In some embodiments, mapping module 34 implements a rule gap in addition to a filter gap to facilitate insertion, after an initial mapping, of additional PCC rules 78' having the same precedence as previously mapped PCC rules. The rule gap is an integer that represents a number of filter gaps to divide mapped PCC rule precedence values from one another. In such embodiments, mapping module 34 assigns, to an initial packet filter derived from one of PCC rules 78', a precedence value that is a multiple of the product of the filter gap and the rule gap. In one example, for a relative precedence r for an initial packet filter as calculated by mapping module 34 according to formula (1), mapping module 34 determines a nearest filter precedence value to r that is a multiple of the product of the filter gap and the rule gap and assigns the determined value to the initial packet filter. Upon receiving an additional PCC rule in PCC rules 78' that maps to r, mapping module 34 instead maps the initial packet filter derived from the additional PCC rule to the filter precedence value defined by r+filter gap, for example. In this way, packet filters derived from multiple PCC rules having the same, or similar, precedence values may be accommodated within a previously established packet filter precedence ordering with a reduced probability of requiring reshuffling of the packet filter precedence values to maintain a proper ordering.

Wireless device 6 receives packet filters 90 for a session from PCEF 32 in download messages 48 and stores the packet filters to packet filters 90'. Control unit 70 of wireless device 6 provides an operating environment for application 71 and filter module 72. Application 71 may initiate services, e.g., a VoIP call, and perform signaling to an application function, such as AF 38 of FIG. 2, to cause PCRF 24 and PCEF 32 to establish adequate bearers for the services. In some instances, application 71 may request QoS resources from PGW 30, such as adequate bearers for newly initiated services. Application 71 passes uplink service data packets for the wireless device 6 session to filter module 72, which applies filters 90' to the uplink service data traffic to select appropriate bearers for the service data packets.

Figure 4:
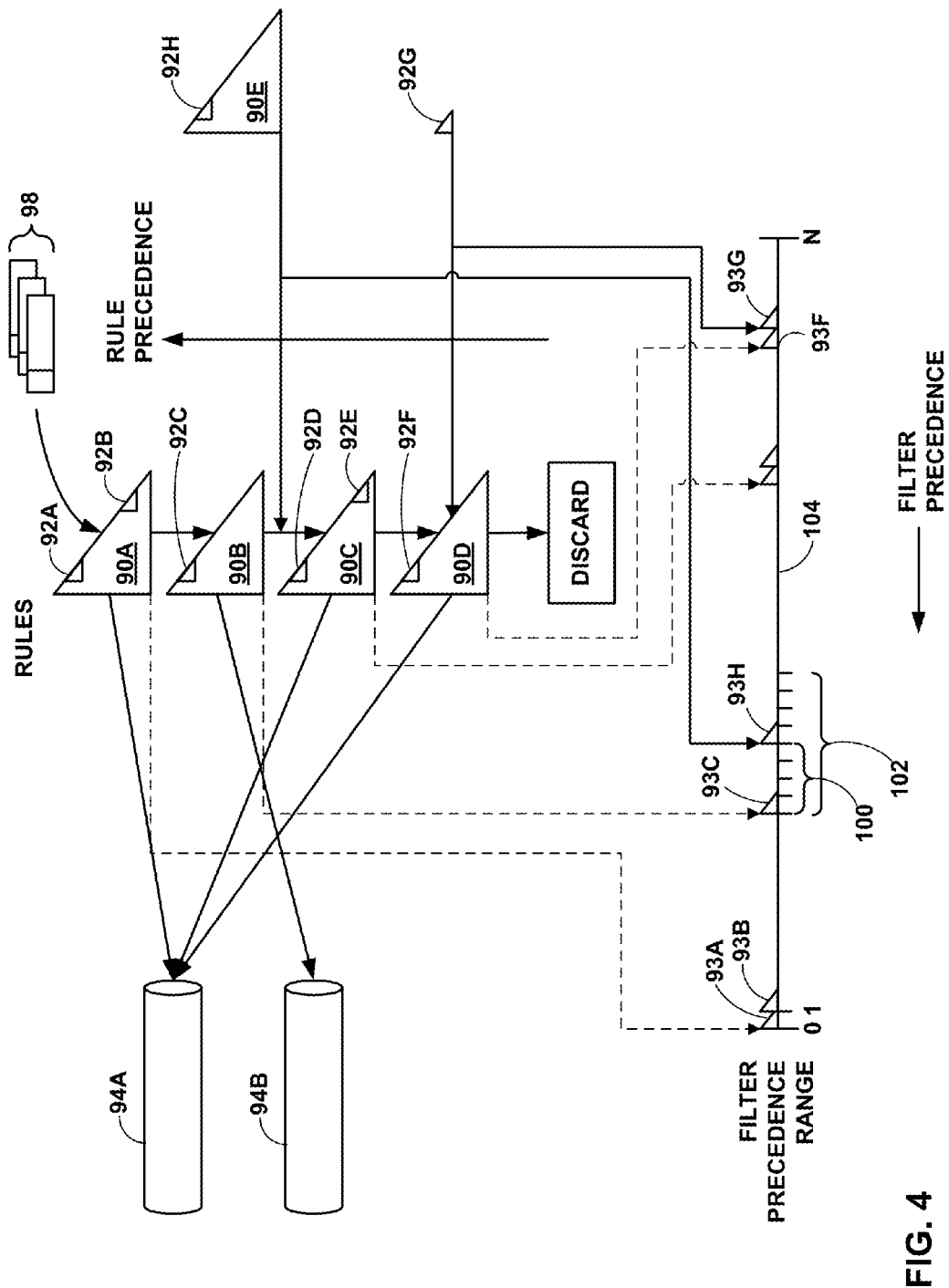
FIG. 4 is a block diagram illustrating dynamic mapping of rule precedence values for session data flow filters of policy control and charging rules to filter precedence values of a filter precedence range

FIG. 4 is a block diagram illustrating dynamic mapping, by mapping module 34, of rule precedence values for session data flow filters 92A–92G ("SDF filters 92") of PCC rules 90A-90E ("PCC rules 90") stored by a PCEF to filter precedence values of filter precedence range 104. PCC rules 90 may represent PCC rules for a particular connectivity access network session. At a first state, each of PCC rules 90A-90D includes one or more of SDF filters 92A-92F to identify the respective session data flows for downlink packets 98 and map the session data flows to the appropriate one of bearers 94A-94B for transport to an attached device. For example, PCC rule 90B includes SDF filter 92C to filter a corresponding session data flow to bearer 94B.

PCC rules 90A-90D each comprise a rule precedence value that defines an order of evaluation of the PCC rules and associated ones of SDF filters 92A-92F. In the illustrated example, for one of downlink packets 98, the PCEF therefore first evaluates SDF filters 92A-92B of PCC rule 90A, then (if the packet fails to match PCC rules 90A) evaluates SDF filter 92C of PCC rules 90B, et sequens. If PCEF finds no matching SDF filter among SDF filters 92A-92F, PCEF discards the packet.

In accordance with the techniques of this disclosure, mapping module 34 obtains minimum and maximum actual PCC rule precedence values for the CAN session. Mapping module 34 then calculates relative precedence values for individual PCC rules 90A-90D from the respective absolute precedence values specified for such rules and maps the relative precedence values to packet filter precedence value range 104. In the illustrated example, PCC rule 90A includes a rule precedence value that is also the minimum actual PCC rule precedence value for the CAN session. Accordingly, mapping module 34 maps a first one of PCC rules 90A-associated SDF filters, e.g., SDF filter 92A, to packet filter precedence value "0" and maps a second one of PCC rules 90A-associated SDF filters, e.g., SDF filter 92B, to packet filter precedence value "1." Mapping module 34 then assigns these respective packet filter precedence values to respective packet filters 93A-93B derived from SDF filters 92A-92B. Mapping module 34 performs mapping and assignment with respect to remaining SDF filters 92C-92F according to the above-described techniques. As a result, filter precedence values for packet filters derived from various SDF filters 92 define an ordering that accords with an ordering defined by rule precedence values for PCC rules 90A-90D that comprise the SDF filter 92.

In the illustrated example, mapping module 34 implements filter gap 100 and a rule gap. In this instance, the value of filter gap 100 is four and the value of the rule gap is two. The product of the rule gap and filter gap 100 is represented by gap 102. During the process of mapping for the first state, mapping module maps SDF filter 92C to a particular filter precedence value for corresponding packet filter 93C. In addition, mapping module 34 maps SDF filter 92F of PCC rule 90D to another particular filter precedence value for corresponding packet filter 93F.

PCEF receives a dynamic update of PCC rule 90A resulting in an additional SDF filter 92G for the PCC rule. Mapping module 34 dynamically maps SDF filter 92G to a filter precedence value, for corresponding packet filter 93G, immediately following the filter precedence value for SDF filter 92F. Because mapping module 34 implements filter gap 100, the mapping module filter precedence value to which SDF filter 92G is mapped is unallocated and mapping is accomplished without recourse to reshuffling.

PCEF also receives a dynamic update including a new PCC rule 90E for the CAN session. The new PCC rule 90E includes SDF filter 92H and comprises a rule precedence value that is identical to the rule precedence value of PCC rule 90B. Because mapping module 34 implements a rule gap, resulting gap 102 provides available packet filter precedence values for dynamic insertion of PCC rules 90E and dynamic mapping, by mapping module 34, of SDF filter 92F to a packet filter precedence value within gap 102 for corresponding packet filter 93G. As a result, mapping module 34 performs precedence value mapping without recourse to reshuffling, despite PCC rule 90B and 90E having identical rule precedence values.

Figure 5A:
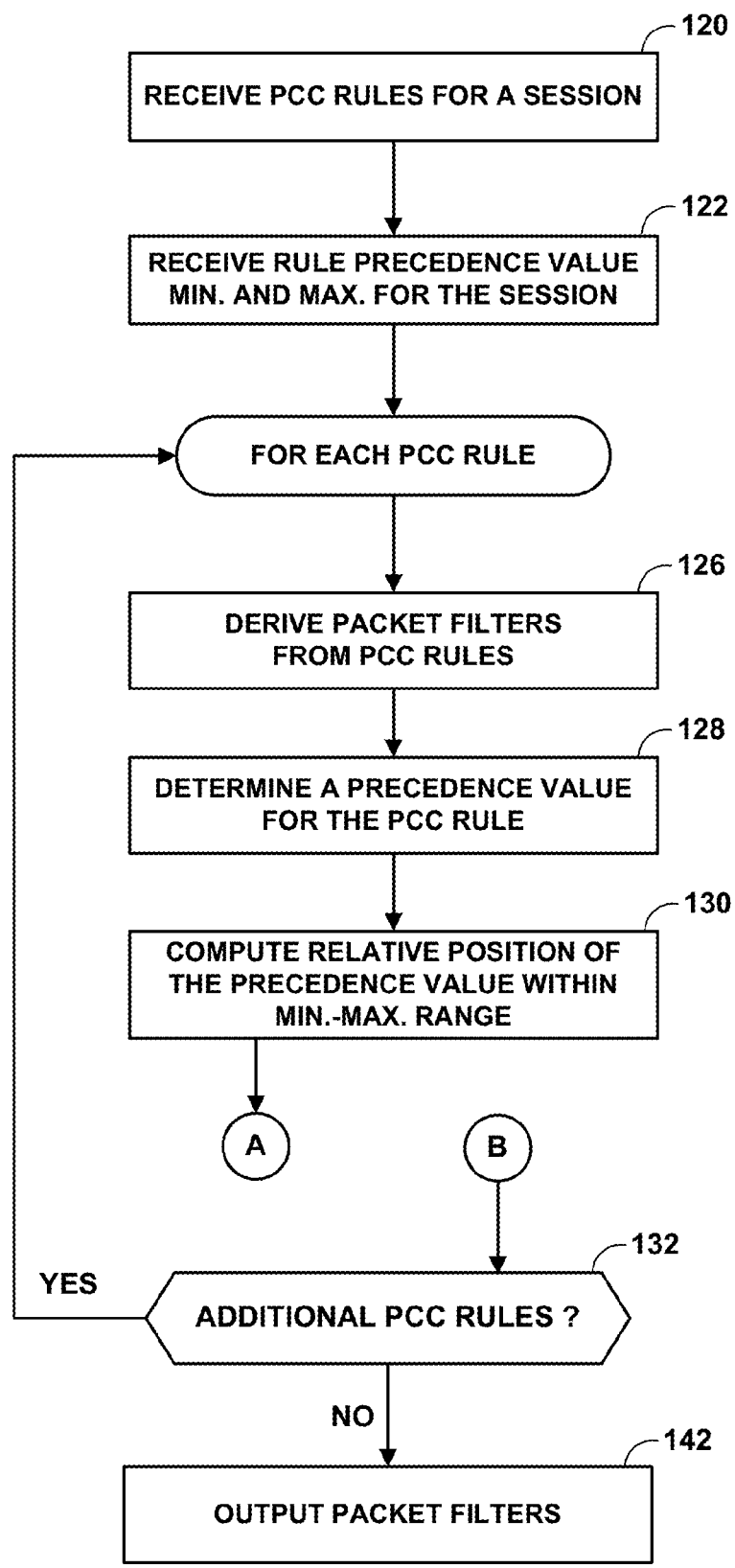
FIGS. 5A-5B illustrate a flow chart representing an example mode of operation of a gateway network device that perform precedence mapping according to the described techniques.
Figure 5B:
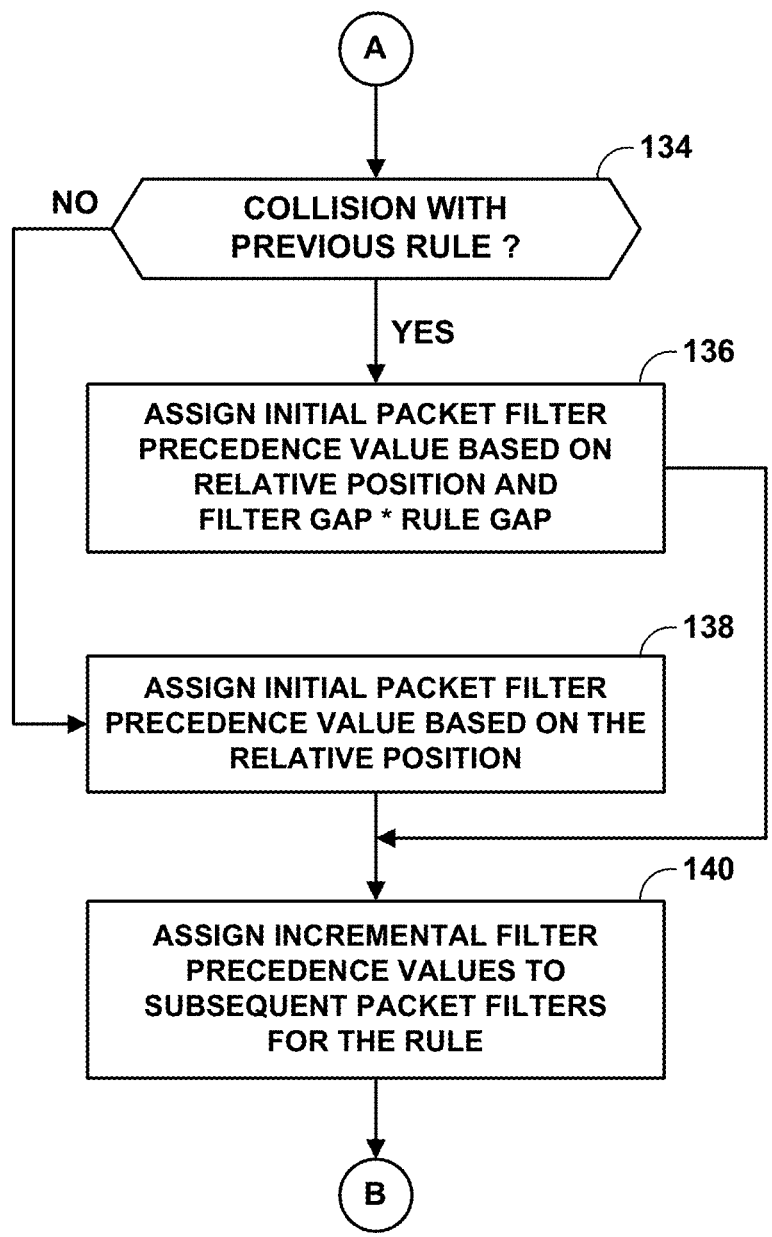

FIGS. 5A-5B includes a flow chart illustrating an example mode of operation of example PGW 30 of FIG. 3 to perform the precedence mapping techniques of this disclosure. PCEF 32 of PGW 30 receives a set of one or more PCC rules for a CAN session for a device that attaches to a network for which PGW 30 operates as a gateway (120). In addition, derivation module 86 of PCEF 32 receives the minimum and maximum rule precedence values for the CAN session (122). For each PCC rule received for the CAN session, derivation module 86 derives one or more packet filters from policy control information and/or service data flow detection information within the PCC rule (126). Using the rule precedence value for the PCC rule (128), mapping module 34 of derivation module 86 computes a relative position of the rule precedence value within a range defined by the minimum and maximum rule precedence values received (130).

If the relative position is similar to a previous PCC rule from which derivation module 86 derived packet filters for assignation of filter precedence values, the relative positions of the PCC rule and the previous PCC rule may collide (YES branch of 134). That is, based solely on relative position, filter precedence values of packet filters derived from the two PCC rules would overlap. To prevent overlap and provide space for dynamic insertion of additional PCC rules and packet filters, mapping module 34 maintains a rule gap and filter gap to follow the filter precedence values of packet filters derived from the previous PCC rule. Mapping module 34 therefore assigns, to an initial packet filter derived from the previous PCC rule, a filter precedence value that is based on both the computed relative position and the product of the rule gap and filter gap (136). For example, mapping module 34 may assign, to the initial packet filter, a filter precedence value that is the multiple of the product of the rule gap and filter gap in the filter range immediately subsequent to the filter precedence value assigned to an initial packet filter of the previous PCC rule.

In the absence of a collision with a previous PCC rule (NO branch of 134), mapping module assigns a filter precedence value to an initial packet filter based on the computed relative position (138). After assigning an initial packet filter precedence value, mapping module 34 increments the filter precedence value assigned to the initial packet filter and assigns the incremented values to additional, subsequent packet filters derived from the PCC rule. For example, mapping module 34 assigns an filter precedence value, V, to the initial packet filter, assigns V+1 to a next packet filter derived from the PCC rule, and assigns V+2 to a still further packet filter derived from the PCC rule (140).

If additional PCC rules remain for packet filter derivation (YES branch of 132), mapping module 34 advances to perform filter mapping techniques on subsequent PCC rules. Otherwise (NO branch of 132), PCEF 32 outputs the derived packet filters for the CAN session, each having filter precedence values mapped according to the techniques of this disclosure, to the device participating in the CAN session.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method of mapping precedence domains between a network device of an access network and a wireless communication device, the method comprising:
receiving, with the network device, a rule for the wireless communication device that defines a first packet filter and a rule precedence value for a rule precedence supported by the network device, wherein the rule precedence value defines an order of the rule within the network device with respect to other rules for the wireless communication device defined within the network device;
receiving, with the network device, a minimum rule precedence value and a maximum rule precedence value;
computing, with the network device, a relative position of the rule precedence value within a rule precedence range defined by the minimum rule precedence value and the maximum rule precedence value;
mapping, with the network device and based on the relative position of the rule precedence value within the rule precedence range, the rule precedence value to a filter precedence value for a filter precedence supported by the wireless communication device by determining the filter precedence value within a filter precedence range, wherein the filter precedence value is an integer value that is a multiple of a filter gap value and a rule gap value that is nearest to a value that has a relative position within the filter precedence range that matches the relative position of the rule precedence value within the rule precedence range, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device; and
outputting, with the network device, a message specifying the first packet filter and the filter precedence value to the wireless communication device.

2. The method of claim 1, wherein mapping the rule precedence value to the filter precedence value based on the relative position comprises determining the filter precedence value within a filter precedence range, wherein the filter precedence value is an integer value nearest to a value that has a relative position within the filter precedence range that matches the relative position of the rule precedence value within the rule precedence range.

3. The method of claim 1, wherein the rule is a first rule that defines a first rule precedence value, the method further comprising:
receiving, with the network device, a second rule for the wireless communication device that defines a second packet filter and a second rule precedence value;
computing, with the network device, a relative position of the second rule precedence value within the rule precedence range defined by the minimum rule precedence value and the maximum precedence value;
mapping, with the network device, the second rule precedence value to a second filter precedence value based on the relative position of the second rule precedence value, wherein the second filter precedence value defines an order of the second packet filter within the wireless communication device with respect to other packet filters defined within the wireless communication device;
determining, with the network device, the second filter precedence value is within an integer range, defined by a product of a filter gap and a rule gap, of filter precedence values subsequent to the filter precedence value mapped from the first rule precedence value; and
setting, with the network device, the second filter precedence value to a value subsequent to the integer range.

4. The method of claim 3, further comprising:
after outputting the message, receiving, with the network device, a third rule for the wireless communication device that defines a third packet filter and a third rule precedence value;
mapping, with the network device, the third rule precedence value to a third filter precedence value that is between the first filter precedence value and the second filter precedence value only when the third rule precedence value is equal to the second rule precedence value, wherein the third filter precedence value defines an order of the third packet filter within the wireless communication device with respect to other packet filters defined within the wireless communication device; and outputting, with the network device, another message specifying the third packet filter and the third filter precedence value to the wireless communication device.

5. The method of claim 1, wherein the rule defines a second packet filter, the method further comprising:
setting a second packet filter precedence value to an integer immediately following the first packet filter precedence value, wherein the second packet filter precedence value defines an order of the second packet filter within the wireless communication device with respect to other packet filters defined within the wireless communication device.

6. The method of claim 1, wherein the rule for the wireless communication device comprises service data flow identification information that identifies packets for transport, the method further comprising:
deriving the first packet filter from the service data flow identification information.

7. The method of claim 1, wherein the rule is a policy charging and control rule for an access network session for the wireless communication device, wherein the rule includes an associated service data flow template having one or more filters that identify packets for mapping to a bearer of the access network bound to the rule.

8. The method of claim 1,
wherein the rule precedence value defines an order of evaluation of the rule by the network device with respect to other rules for the wireless communication device defined within the network device, and
wherein the filter precedence value defines an order of evaluation of the first packet filter within the wireless communication device with respect to other packet filters defined within the wireless communication device.

9. A network device of an access network, comprising:
a packet management entity that receives a rule, for a wireless communication device attached to the access network, that defines a first packet filter and a rule precedence value for a rule precedence supported by the network device, wherein the rule precedence value defines an order of the rule within the network device with respect to other rules for the wireless communication device defined within the network device;
a derivation module that receives a minimum rule precedence value and a maximum rule precedence value; and
a mapping module that computes a relative position of the rule precedence value within a rule precedence range defined by the minimum rule precedence value and the maximum rule precedence value,
wherein the mapping module maps, based on the relative position of the rule precedence value within the rule precedence range, the rule precedence value to a filter precedence value for a filter precedence supported by the wireless communication device by determining the filter precedence value within a filter precedence range, wherein the filter precedence value is an integer value that is a multiple of a filter gap value and a rule gap value that is nearest to a value that has a relative position within the filter precedence range that matches the relative position of the rule precedence value within the rule precedence range, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device, and
wherein packet management entity outputs a message specifying the first packet filter and the filter precedence value to the wireless communication device.

10. The network device of claim 9, wherein the mapping module determines the filter precedence value within a filter precedence range, wherein the filter precedence value is an integer value nearest to a value that has a relative position within the filter precedence range that matches the relative position of the rule precedence value within the rule precedence range.

11. The network device of claim 9,
wherein the rule is a first rule that defines a first rule precedence value,
wherein the packet management entity receives a second rule for the wireless communication device that defines a second packet filter and a second rule precedence value,
wherein the mapping module computes a relative position of the second rule precedence value within the rule precedence range defined by the minimum rule precedence value and the maximum precedence value,
wherein the mapping module maps the second rule precedence value to a second filter precedence value based on the relative position of the second rule precedence value, wherein the second filter precedence value defines an order of the second packet filter within the wireless communication device with respect to other packet filters defined within the wireless communication device, and
wherein the mapping module determines the second filter precedence value is within an integer range, defined by a product of a filter gap and a rule gap, of filter precedence values subsequent to the filter precedence value mapped from the first rule precedence value and sets the second filter precedence value to a value subsequent to the integer range.

12. The network device of claim 9,
wherein the rule defines a second packet filter, and
wherein the mapping module sets a second packet filter precedence value to an integer immediately following the first packet filter precedence value, wherein the second packet filter precedence value defines an order of the second packet filter within the wireless communication device with respect to other packet filters defined within the wireless communication device.

13. The network device of claim 9, wherein the rule for the wireless communication device comprises service data flow identification information that identifies packets for transport, the network device further comprising:
a derivation module that derives the first packet filter from the service data flow identification information.

14. The network device of claim 9,
wherein the rule is a policy charging and control rule for an access network session for the wireless communication device, wherein the rule includes an associated service data flow template having one or more filters that identify packets for mapping to a bearer of the access network bound to the rule,
wherein the packet management entity is a Policy and Charging Enforcement Function entity.

15. The network device of claim 9,
wherein the rule precedence value defines an order of evaluation of the rule by the network device with respect to other rules for the wireless communication device defined within the network device, and wherein the filter precedence value defines an order of evaluation of the first packet filter within the wireless communication device with respect to other packet filters defined within the wireless communication device.

16. A non-transitory computer-readable medium comprising instructions for causing a programmable processor to:

receive, with a network device of an access network, a rule for a wireless communication device that defines a first packet filter and a rule precedence value for a rule precedence supported by the network device, wherein the rule precedence value defines an order of the rule within the network device with respect to other rules for the wireless communication device defined within the network device;

receive, with the network device, a minimum rule precedence value and a maximum rule precedence value;

compute, with the network device, a relative position of the rule precedence value within a rule precedence range defined by the minimum rule precedence value and the maximum rule precedence value;

map, with the network device and based on the relative position of the rule precedence value within the rule precedence range, the rule precedence value to a filter precedence value for a filter precedence supported by the wireless communication device by determining the filter precedence value within a filter precedence range, wherein the filter precedence value is an integer value that is a multiple of a filter gap value and a rule gap value that is nearest to a value that has a relative position within the filter precedence range that matches the relative position of the rule precedence value within the rule precedence range, wherein the wireless communication device does not support the rule precedence supported by the network device, wherein a number of rule precedence levels with which to specify a rule precedence value exceeds a number of filter precedence levels with which to specify a filter precedence value, and wherein the filter precedence value defines an order of the first packet filter within the wireless communication device with respect to other packet filters defined within the wireless communication device; and output, with the network device, a message specifying the first packet filter and the filter precedence value to the wireless communication device.

* * * * *